US008975337B2

(12) United States Patent
Hoess et al.

(10) Patent No.: US 8,975,337 B2
(45) Date of Patent: Mar. 10, 2015

(54) MOULDING COMPOUND FOR MOULDINGS WITH HIGH WEATHER RESISTANCE

(75) Inventors: Werner Hoess, Shanghai (CN); Michael Wicker, Seeheim-Jugenheim (DE); Klaus Schultes, Wiesbaden (DE); Klaus Albrecht, Mainz (DE); Martin Mohrmann, Weiterstadt (DE)

(73) Assignee: Evonik Röhm GmbH, Darmstadt (DE)

( * ) Notice: Subject to any disclaimer, the term of this patent is extended or adjusted under 35 U.S.C. 154(b) by 0 days.

(21) Appl. No.: 13/241,776

(22) Filed: Sep. 23, 2011

(65) Prior Publication Data

US 2012/0015141 A1 Jan. 19, 2012

Related U.S. Application Data

(63) Continuation of application No. 11/579,329, filed as application No. PCT/EP2005/003652 on Apr. 7, 2005, now abandoned.

(30) Foreign Application Priority Data

May 5, 2004 (DE) .................. 10 2004 022 540

(51) Int. Cl.
C08L 33/04 (2006.01)
C08L 33/12 (2006.01)
C08L 35/06 (2006.01)

(52) U.S. Cl.
CPC ............... *C08L 33/04* (2013.01); *C08L 33/12* (2013.01); *C08L 2205/02* (2013.01)
USPC ........... 525/228; 524/515; 524/523; 525/191; 525/227; 525/241

(58) Field of Classification Search
USPC .......... 525/191, 222, 227, 228, 241; 524/515, 524/523
See application file for complete search history.

(56) References Cited

U.S. PATENT DOCUMENTS

| | | | |
|---|---|---|---|
| 3,681,475 A | 8/1972 | Spilner | |
| 4,558,098 A | 12/1985 | Kamata et al. | |
| 4,696,978 A | 9/1987 | Dean | |
| 4,833,221 A | 5/1989 | Albrecht | |
| 5,110,877 A | 5/1992 | Hoess et al. | |
| 5,155,172 A | 10/1992 | Siol et al. | |
| 5,219,931 A | 6/1993 | Siol et al. | |
| 5,270,397 A | 12/1993 | Rhein et al. | |
| 5,280,073 A | 1/1994 | Siol et al. | |
| 5,530,080 A | 6/1996 | Siol et al. | |
| 5,548,033 A | 8/1996 | Vetter et al. | |
| 5,612,417 A | 3/1997 | Rhein et al. | |
| 5,652,316 A | 7/1997 | May et al. | |
| 5,705,189 A | 1/1998 | Lehmann et al. | |
| 5,726,245 A | 3/1998 | Numrich et al. | |
| 6,040,387 A | 3/2000 | Albrecht et al. | |
| 6,214,942 B1 | 4/2001 | Siol et al. | |
| 6,287,470 B1 | 9/2001 | Vetter et al. | |
| 6,355,712 B1 | 3/2002 | Schultes et al. | |
| 6,576,255 B1 | 6/2003 | Petereit et al. | |
| 6,613,871 B2 | 9/2003 | Hoess et al. | |
| 6,765,046 B1 | 7/2004 | Numrich et al. | |
| 6,803,416 B2 | 10/2004 | Schultes et al. | |
| 6,809,163 B2 | 10/2004 | Schultes et al. | |
| 6,890,993 B2 | 5/2005 | Schultes et al. | |
| 6,998,140 B2 | 2/2006 | Meier et al. | |
| 7,046,952 B2 | 5/2006 | Kurotori et al. | |
| 7,179,852 B2 | 2/2007 | Schultes et al. | |
| 7,371,795 B2 | 5/2008 | Wicker et al. | |
| 7,381,552 B2 | 6/2008 | Menzier et al. | |
| 7,456,239 B2 | 11/2008 | Theil et al. | |
| 7,498,044 B2 | 3/2009 | Petereit et al. | |
| 7,498,373 B2 | 3/2009 | Schmitt et al. | |
| 7,585,565 B2 | 9/2009 | Schultes et al. | |
| 7,605,193 B2 | 10/2009 | Schultes et al. | |
| 7,682,698 B2 | 3/2010 | Schultes et al. | |
| 7,683,131 B2 | 3/2010 | Goldacker et al. | |
| 7,695,813 B2 | 4/2010 | Schultes et al. | |
| 7,754,317 B2 | 7/2010 | Neuhaeuser et al. | |
| 7,790,079 B2 | 9/2010 | Hoess et al. | |
| 7,879,938 B2 | 2/2011 | Häger et al. | |
| 7,879,966 B2 | 2/2011 | Petereit et al. | |
| 8,268,939 B2 | 9/2012 | Ebbrecht et al. | |
| 2002/0160042 A1 | 10/2002 | Petereit et al. | |
| 2004/0104501 A1 | 6/2004 | Petereit et al. | |
| 2005/0080188 A1 | 4/2005 | Schultes et al. | |

(Continued)

FOREIGN PATENT DOCUMENTS

| | | |
|---|---|---|
| EP | 0 113 105 | 7/1984 |
| JP | 62-156156 | 7/1987 |
| JP | 08-060000 | 3/1996 |
| JP | 2003-292714 | 10/2003 |
| JP | 2005-276566 | 10/2005 |
| JP | 2006-199914 | 8/2006 |

OTHER PUBLICATIONS

Office Action issued Jul. 22, 2011, in Canandian application No. 2,565,476, published Nov. 17, 2005.

(Continued)

*Primary Examiner* — Irina S Zemel
*Assistant Examiner* — Jeffrey Lenihan
(74) *Attorney, Agent, or Firm* — Oblon, McClelland, Maier & Neustadt, L.L.P.

(57) ABSTRACT

A molding compound comprises a copolymer (I)a), produced by polymerization of 90-100% by weight methylmethacrylate, styrene and malic acid anhydride, and optionally 0-10% by weight additional monomers which can be copolymerized with methylmethacrylate, a (co)polymer (II)b), produced by polymerization of 80-100% by weight methylmethacrylate and optionally 0-20% by weight additional monomers which can be copolymerized with methylmethacrylate, and has a solution viscosity in chloroform at 25° C. (ISO 1628 Part 6) of 50 to 55 ml/g, as well as c) optional conventional additives, auxiliary agents and/or fillers. The molding compound is characterized in that the copolymer (I) has a solution viscosity in chloroform at 25° C. (ISO 1628 Part) of 55 ml/g or less. Also disclosed are moldings produced by thermoplastic processing of the molding compound and their uses.

21 Claims, No Drawings

(56) References Cited

U.S. PATENT DOCUMENTS

| | | |
|---|---|---|
| 2006/0052515 A1 | 3/2006 | Schultes et al. |
| 2006/0121248 A1 | 6/2006 | Lorenz et al. |
| 2006/0175735 A1 | 8/2006 | Hoess et al. |
| 2007/0055017 A1 | 3/2007 | Schultes et al. |
| 2007/0222117 A1 | 9/2007 | Hoess et al. |
| 2007/0276093 A1 | 11/2007 | Schultes et al. |
| 2008/0132627 A1 | 6/2008 | Schultes et al. |
| 2008/0248298 A1 | 10/2008 | Numrich et al. |
| 2008/0281023 A1 | 11/2008 | Numrich et al. |
| 2008/0305335 A1 | 12/2008 | Schultes et al. |
| 2009/0043044 A2 | 2/2009 | Schwarz-Barac et al. |
| 2009/0105399 A1 | 4/2009 | Schultes et al. |
| 2009/0176928 A1 | 7/2009 | Schultes et al. |
| 2009/0226730 A1 | 9/2009 | Hoess et al. |
| 2010/0098907 A1 | 4/2010 | Schultes et al. |
| 2010/0098908 A1 | 4/2010 | Schultes et al. |
| 2010/0148401 A1 | 6/2010 | Schultes et al. |
| 2010/0167045 A1 | 7/2010 | Schultes et al. |
| 2010/0174022 A1 | 7/2010 | Schultes et al. |
| 2010/0189983 A1 | 7/2010 | Numrich et al. |
| 2010/0213636 A1 | 8/2010 | Schmidt et al. |
| 2010/0272960 A1 | 10/2010 | Schultes et al. |
| 2011/0009539 A1 | 1/2011 | Goldacker et al. |
| 2011/0015317 A1 | 1/2011 | Khrenov et al. |
| 2011/0230610 A1 | 9/2011 | Schultes et al. |
| 2012/0321857 A1 | 12/2012 | Schmidt et al. |
| 2012/0322932 A1 | 12/2012 | Schultes et al. |

OTHER PUBLICATIONS

U.S. Appl. No. 11/748,874, filed May 15, 2007, Schultes, et al.
U.S. Appl. No. 60/831,222, filed Jul. 17, 2006, Hager, et al.
U.S. Appl. No. 13/123,544, filed Apr. 11, 2011, Battenhausen, et al.
U.S. Appl. No. 13/123,790, filed Apr. 12, 2011, Battenhausen, et al.
Japanese Office Action issued Aug. 17, 2011, in Patent Application No. 2010-537341 (submitting German translation only).
U.S. Appl. No. 13/824,624, filed Apr. 18, 2013, Khrenov, et al.

MOULDING COMPOUND FOR MOULDINGS WITH HIGH WEATHER RESISTANCE

The invention relates to a molding composition for molded parts with high weathering resistance.

PRIOR ART

EP 0 113 105 A1 describes heat-resistant methacrylate plastic mixtures composed of two copolymers. Copolymer I is obtained via polymerization of methyl methacrylate, of an aromatic vinyl component, and of maleic anhydride, and copolymer II is a polymer composed of from 80 to 100% by weight of methyl methacrylate and of from 0 to 20% by weight of other copolymerizable ethylenic monomers.

In particular, the copolymer I can be composed of from 50 to 98% by weight of methyl methacrylate, from 1 to 25% by weight of styrene, and from 1 to 25% by weight of maleic anhydride. The preparation process is described as non-critical. By way of example, a specific proposal converts the monomers mentioned via partial polymerization to give a prepolymer in the presence of 2,2'-azobis(2,4-dimethylvaleronitrile) as initiator and of tert-dodecyl mercaptan as molecular-weight regulator. The prepolymer is then polymerized first for 30 minutes at 80° C. and then again for 2 hours at 130° C. in the presence of lauryl 2,2'-peroxide as initiator and tert-dodecyl mercaptan in a polymerization cell to give a sheet. The polymer sheet is then comminuted to give pellets. Nothing is said about the molecular weight of the polymer, but a factor deserving attention is that the preparation process necessarily has to lead to comparatively high molecular weights, attended by solution viscosities in chloroform of more than 60 ml/g at 25° C. (ISO 1628-Part 6).

In EP 0 113 105 A1, various mixtures of the copolymer I with a commercially available polymethyl methacrylate molding composition as copolymer II are prepared and their properties are studied. The product is plastics mixtures with high transparency, with no detectable tendency toward yellowing in the case of injection-molded parts, and with high weathering resistance after exposure for 1100 hours.

OBJECT AND SOLUTION OF OBJECT

Starting from EP 0 113 105 A1, the intention was to provide a molding composition whose weathering resistance has been further improved and whose MVR flowability (230° C./3.8 kg) in particular in the region advantageous for injection molding is from 2.5 to 5.0 cm$^3$/10 min. In particular, the intention is that the surface of specimens subjected to long-term weathering exhibit only very slight or no cracking. The intention was that, when comparison is made with EP 0 113 105 A1, there is to be no or only very slight impairment of the Vicat softening temperature VST (ISO 306-B50), and that this is to achieve a value of 109° C.

The object is achieved via a molding composition, encompassing the following components a) a copolymer (I), polymerized to an extent of from 90 to 100% by weight from methyl methacrylate, styrene, and maleic anhydride, and, if appropriate, from 0 to 10% by weight of other monomers copolymerizable with methyl methacrylate, characterized via a solution viscosity in chloroform at 25° C. (ISO 1628-Part 6) of less than or equal to 55 ml/g b) a (co)polymer (II), polymerized from 80 to 100% by weight of methyl methacrylate and, if appropriate, from 0 to 20% by weight of other monomers copolymerizable with methyl methacrylate whose solution viscosity in chloroform at 25° C. (ISO 1628-Part 6) is from 50 to 55 ml/g, and c) optionally conventional additives, auxiliaries, and/or fillers, characterized in that the solution viscosity of the copolymer (I) in chloroform at 25° C. (ISO 1628-Part 6) is less than or equal to 55 ml/g.

BRIEF DESCRIPTION OF THE INVENTION

The inventive molding composition encompasses or is composed of the following components a. a copolymer (I), polymerized to an extent of from 90 to 100% by weight from methyl methacrylate, styrene, and maleic anhydride, and, if appropriate, from 0 to 10% by weight of other monomers copolymerizable with methyl methacrylate, characterized via a solution viscosity in chloroform at 25° C. (ISO 1628-Part 6) of less than or equal to 55 ml/g b. a (co)polymer (II), polymerized from 80 to 100% by weight of methyl methacrylate and, if appropriate, from 0 to 20% by weight of other monomers copolymerizable with methyl methacrylate whose solution viscosity in chloroform at 25° C. (ISO 1628-Part 6) is from 50 to 55 ml/g, and c. optionally conventional additives, auxiliaries, and/or fillers The advantageous properties of the inventive molding composition are substantially based on the mixture of copolymer (I) with the (co)polymer (II). A decisive factor for the properties improved in comparison with EP 0 113 105 A1 is the low molecular weight of the copolymer (I), characterized via a solution viscosity in chloroform at 25° C. (ISO 1628-Part 6) of less than or equal to 55 ml/g. It is self-evident that the molding composition can in many instances comprise not only the copolymer (I) and the (co)polymer (II) but also conventional additives, auxiliaries, and/or fillers, examples being colorants, pigments, or organic dyes, in the case of colored injection-molded parts.

A test specimen produced, for example via injection molding, from the inventive molding composition can have the following properties simultaneously.

$ a Vicat softening temperature VST (ISO 306-B50) of at least 108° C., preferably of 110-115° C., $ a melt index MVR (ISO 1133, 230° C./3.8 kg) of at least from 2.5 to 5.0, preferably from 2.8 to 4.9, cm$^3$/10 min.

$ Xenotest weathering resistance (DIN EN ISO 4893, Part 2) after 10 000 hours characterized via a yellowness index (DIN 6167) of less than or equal to 2.0.

The Xenotest to DIN EN ISO 4892, Part 2 (artificial weathering or irradiation in devices—filtered xenon arc irradiation) can be carried out by the person skilled in the art, for example using the following parameters: Beta LM Xenotest device; lower wavelength threshold lambda G=300 nm (Xenochrom 300 filter); black standard temperature=65+/−3° C.; water spray/drying cycle: 18 min of water spray, 102 min of drying time; relative humidity during drying=65%; constant conditions=continuous irradiation of specimens; irradiation intensity=standard method A (artificial weathering); test device: Xenosensitiv (lambda from 300 to 400 nm), controllable from 45 to 120 W/m$^2$, normal specification 60 W/m$^2$.

The molding composition is further characterized in that the increase in yellowness index (DIN 6167, D65/10° illuminant, 3 mm) of a test specimen produced from the molding composition is not more than 1.5 units, preferably not more than 1.0 unit, after Xenotest weathering (DIN EN ISO 4893, Part 2) for 10 000 hours.

The molding composition is characterized in that a test specimen produced from the molding composition has no cracking visible to the naked eye after Xenotest weathering (DIN EN ISO 4893, Part 2) for 5000 hours, indeed even after 10 000 hours.

The molding composition is characterized in that when the Taber 203 scratch hardness of a test specimen produced from the molding composition is determined using an applied force of 3.0 N the value obtained is not more than 3 μm crack depth, in particular not more than 2.8 μm crack depth.

Copolymer (I)

The (co)polymer (II) is composed of from 80 to 100% by weight, preferably from 90 to 100% by weight, in particular from 99 to 100% by weight, of methyl methacrylate, styrene, and maleic anhydride. If appropriate, from 0 to 20% by weight, preferably from 0 to 10% by weight, in particular from 0 to 1% by weight, of other comonomers capable of free-radical polymerization can also be present, examples being α-methylstyrene or C1-C4-alkyl (meth)acrylates, in particular methyl acrylate, ethyl acrylate, or butyl acrylate, in particular n-butyl acrylate.

The copolymer (I) is particularly preferably composed only of units capable of free-radical polymerization and composed of methyl methacrylate, styrene, and maleic anhydride.

Examples of suitable quantitative proportions can be:

from 50 to 90% by weight, preferably from 70 to 80% by weight, of methyl methacrylate, from 10 to 20% by weight, preferably from 12 to 18% by weight, of styrene, and from 5 to 15% by weight, preferably from 8 to 12% by weight, of maleic anhydride.

The solution viscosity of the copolymer (I) in chloroform at 25° C. (ISO 1628-Part 6) is less than or equal to 55 ml/g, preferably less than or equal to 50 ml/g, in particular from 40 to 55 ml/g, particularly preferably from 43 to 50 ml/g.

This can correspond to a molar mass $M_w$ (weight-average) of 95 000 g/mol ($M_w$ determination by means of gel permeation chromatography based on polymethyl methacrylate as calibration standard). By way of example, molecular weight $M_w$ can be determined by gel permeation chromatography or by a light-scattering method (see, for example, H. F. Mark et al., Encyclopedia of Polymer Science and Engineering, 2nd Edition, Vol. 10, pages 1 ff., J. Wiley, 1989).

Corresponding copolymers can be obtained in a manner known per se via free-radical polymerization. EP-A 264 590 describes by way of example a process for preparation of a molding composition composed of a monomer mixture composed of methyl methacrylate, of a vinylaromatic compound, and of maleic anhydride, and, if appropriate, of a lower alkyl acrylate, where the polymerization is carried out to 50% conversion in the presence or absence of a non-polymerizable organic solvent, and where, starting at conversion of at least 50%, the polymerization is continued in the temperature range from 75 to 150° C. in the presence of an organic solvent as far as at least 80% conversion, and then the low-molecular-weight volatile constituents are evaporated.

JP-A 60 147 417 describes a process for preparation of a highly heat-resistant polymethacrylate molding composition in which a monomer mixture composed of methyl methacrylate and of maleic anhydride, and of at least one vinylaromatic compound is fed to a polymerization reactor suitable for solution polymerization or bulk polymerization at a temperature from 100 to 180° C. and is polymerized. DE-A 44 40 219 describes another preparation process.

By way of example, the copolymer (I) can be prepared by taking a monomer mixture composed of, for example, 6355 g of methyl methacrylate, 1271 g of styrene, and 847 g of maleic anhydride, and admixing 1.9 g of tert-butyl perneodecanoate and 0.85 g of tert-butyl 3,5,5-trimethylperoxyhexanoate as polymerization initiator and 19.6 g of 2-mercaptoethanol as molecular weight regulator, and 4.3 g of palmitic acid. The resultant mixture can be charged to a polymerization cell and, for example, devolatilized for 10 minutes. The mixture can then be polymerized in a water bath, for example for 6 hours at 60° C., and then for 30 hours at 55° C. water bath temperature. After about 30 hours, the polymerization mixture reaches its maximum temperature: about 126° C. Once the polymerization cell has been removed from the water bath, the polymer corresponding to component a) is further heat-conditioned in the polymerization cell for about 7 hours, for example at 117° C., in an oven under air.

(Co)polymer (II)

The copolymer (II) is a (meth)acrylate (co)polymer whose solution viscosity in chloroform at 25° C. (ISO 1628-Part 6) is from 50 to 55 ml/g, preferably from 52 to 54 ml/g.

This can correspond to a molar mass Mw (weight-average) in the range from 80 000 to 200 000 g/mol, preferably from 100 000 to 150 000 g/mol. By way of example, molecular weight $M_w$ can be determined by gel permeation chromatography or by a light-scattering method (see, for example, H. F. Mark et al., Encyclopedia of Polymer Science and Engineering, 2nd Edition, Vol. 10, pages 1 ff., J. Wiley, 1989).

The (co)polymer (II) is a homopolymer or copolymer composed of at least 80% by weight of methyl methacrylate and, if appropriate, up to 20% by weight of other monomers copolymerizable with methyl methacrylate. The (co)polymer (II) is composed of from 80 to 100% by weight, preferably from 90 to 99.5% by weight, of methyl methacrylate units polymerized by a free-radical route and, if appropriate, of from 0 to 20% by weight, preferably from 0.5 to 10% by weight, of other comonomers capable of free-radical polymerization, e.g. C1-C4-alkyl (meth)acrylates, in particular methyl acrylate, ethyl acrylate, or butyl acrylate, preferably n-butyl acrylate. The average molar mass $M_w$ of the copolymer (II) is preferably in the range from 90 000 g/mol to 200 000 g/mol, in particular from 100 000 g/mol to 150 000 g/mol.

By way of example, the (co)polymer II can have been polymerized from from 95 to 99.5% by weight of methyl methacrylate and from 0.5 to 5% by weight, preferably from 1 to 4% by weight, of methyl acrylate.

The Vicat softening temperature VST (ISO 306-B50) of the (co)polymer (II) can be at least 107° C., preferably from 108 to 114° C. The melt index MVR (ISO 1133, 230° C./3.8 kg) can, for example, be in the range greater than or equal to 2.5 cm$^3$/10 min.

Conventional Additives, Auxiliaries, and/or Fillers

The molding composition can also comprise, alongside the polymer mixture composed of the copolymer (I) and of the (co)polymer (II), in a manner known per se, conventional additives, auxilaries, and/or fillers, examples being heat stabilizers, UV stabilizers, UV absorbers, antioxidants, and/or colorants, pigments, or organic dyes. It is preferable that the amount of conventional additives, auxiliaries, and/or fillers present is not more than 10% by weight, particularly preferably not more than 5% by weight, in particular not more than 2% by weight. The molding composition can, if appropriate, also comprise absolutely no additives, auxiliaries, and/or fillers.

For the injection-molding process, lubricants or mold-release agents are particularly important, and can reduce the level of, or entirely prevent, possible adhesion of the polymer mixture to the injection mold. Furthermore, many moldings in particular, particularly injection-molded parts, are non-transparent but have a color, therefore comprising colorants, pigments, or organic dyes, as additives. Parts for outdoor uses generally comprise UV stabilizers, UV absorbers, or antioxidants for additional protection from weathering.

Lubricants can therefore be used as auxiliaries, examples being those selected from the group of the saturated fatty acids whose number of carbon atoms is less than $C_{20}$, preferably from $C_{16}$ to $C_{18}$, or from the saturated fatty alcohols whose number of carbon atoms is less than $C_{20}$, preferably from $C_{16}$ to $C_{18}$. Quantitative proportions present are preferably very small, at most 0.25% by weight, for example from 0.05 to 0.2% by weight, based on the polymer mixture.

Examples of suitable materials are stearic acid, palmitic acid, industrial mixtures composed of stearic and palmitic acid. Examples of other suitable materials are n-hexadecanol, n-octadecanol, and industrial mixtures composed of n-hexadecanol and n-octadecanol.

Stearyl alcohol is a particularly preferred lubricant or mold-release agent.

Preparation of the Molding Composition

The molding composition or polymer mixture can be prepared via dry blending of components a) and b), which may take the form of powder, beads, or preferably pellets.

It is preferable that the copolymers (I) and the (co)polymer (II) are present in a ratio of copolymers (I) to (co)polymer (II) which is from 95 to 5 to 5 to 95, preferably from 20 to 80 to 80 to 20, in particular from 20 to 60 to 80 to 40, in each case based on parts by weight.

The polymer mixture can also be processed via melting and mixing of the individual components in the melt, or via melting of dry premixes of the individual components, to give a ready-to-use molding composition. This can take place by way of example in single- or twin-screw extruders. The resultant extrudate can then be pelletized. Conventional additives, auxiliaries, and/or fillers c) can be directly admixed or can be added as required subsequently by the further processor.

Uses of the Molding Composition/Moldings

The inventive molding composition can be used in a manner known per se to produce molded parts, entirely or to some extent via thermoplastic processing, in particular injection molding or extrusion, or via coextrusion or lamination, or else via lacquering. A feature of the inventive moldings, due to the inventive molding composition present, is high weathering resistance, very little tendency toward yellowing, and very little tendency toward cracking. The surface is also highly scratch-resistant.

The moldings are composed entirely or to some extent of the inventive molding composition, which is preferably composed to an extent of from 90 to 100% by weight of the copolymer (I) and of the (co)polymer (II), and, if appropriate, to an extent of from 0 to 10% by weight of conventional additives, auxiliaries, and/or fillers.

Examples of extruded moldings can be solid sheets, corrugated sheets, panels having cavities, in particular multiple-web sandwich panels, twin-web sandwich panels, triple-web sandwich panels, or quadruple-web sandwich panels, or sandwich panels with lattice geometry, or other sandwich panels.

Injection molded parts can by way of example be parts of household devices, of communications devices, of equipment for hobbies or for sports, or are bodywork parts, or are parts of bodywork parts in automobile construction, in shipbuilding, or in aircraft construction, examples being lamp covers, instrument covers, tachometer covers, displays, panels, or decorative strips. Parts of moldings, e.g. bodywork parts in automobile construction, in shipbuilding, or in aircraft construction, can be parts with a layer structure, where the inventive molding composition is used by way of example as external clear-lacquer layer and/or as internal layer provided with a colorant.

Typical examples of bodywork parts or parts of bodywork parts of automobiles are lamp covers, instrument covers, tachometer covers, panels, decorative strips, spoilers, roof modules, or exterior-mirror housings.

The inventive molding composition can be particularly advantageously used for the coating of surfaces or for the impregnation of wood, because it has high weathering resistance.

A possible method of application introduces the molding composition into an organic solvent or a solvent mixture and then processes it as a lacquer.

As an alternative, wood can be coated by the injection-molding process, by injecting a melt of the inventive molding composition over an article composed of wood, e.g. a control knob or a panel, in an injection mold.

EXAMPLES

A) Preparation of a Copolymer (I)

The copolymer (II is a copolymer composed of 75% by weight of methyl methacrylate, 15% by weight of styrene, and 10% by weight of maleic anhydride.

The procedure takes a monomer mixture composed of 6355 g of methyl methacrylate, 1271 g of styrene, and 847 g of maleic anhydride, and admixes this with 1.9 g of tert-butyl perneodecanoate and 0.85 g of tert-butyl 3,5,5-trimethylperoxyhexanoate as polymerization initiator, and 19.6 g of 2-mercaptoethanol as molecular weight regulator, and with 4.3 g of palmitic acid.

The resultant mixture is charged to a polymerization cell and devolatilized for 10 minutes. The mixture can then be polymerized in a water bath, for example for 6 hours at 60° C., and then for 30 hours at 55° C. water bath temperature. After about 30 hours, the polymerization mixture reaches its maximum temperature: 126° C.

Once the polymerization cell has been removed from the water bath, the polymer is further heat-conditioned in the polymerization cell for 7 hours, at 117° C., in an oven under air.

The resultant copolymer (I) is clear and almost colorless, and its V.N. (solution viscosity number to ISO 1628-6, 25° C., chloroform) is 48.7 ml/g. The flowability of the copolymer was determined as MVR=3.27 $cm^3$/10 min to ISO 1133 at 230° C., using 3.8 kg.

B) (Co)polymer (II)

The (co)polymer (II) used comprised: a commercially available copolymer composed of 99% by weight of methyl methacrylate and 1% by weight of methyl acrylate whose solution viscosity in chloroform at 25° C. (ISO 1628-Part 6) was about 53 ml/g.

C) Copolymer (III)

The Material Used for Comparison Comprised:

A commercially available copolymer (copolymer III) composed of 75% by weight of methyl methacrylate, 15% by weight of styrene, and 10% by weight of maleic anhydride whose solution viscosity to ISO 1628-6, 25° C., chloroform, was 68 ml/g. Copolymer (III) therefore differs from copolymer (I) only in the higher molecular weight.

D) Preparation of Molding Compositions A to D

Molding compositions A to D were prepared via mixing of the copolymers I, II, and, respectively, III.

Once the individual components had been weighed out into a 10 l mixing drum, a homogeneous pellet mixture was prepared via mixing for 5 minutes on a tumbling mixer. The mixture was placed in the hopper of a single-screw extruder with 35 mm screw diameter and extruded at 230° C. melt temperature. Extrudates were drawn from the extruder die head and were chopped by means of a pelletizer to give pellets after cooling in a water bath and then in an air-cooling section. This procedure was used to prepare mixtures composed of copolymer I and copolymer II, and also mixtures composed of copolymer II and copolymer III.

For testing of rheological properties, a sample amount of the pellets was used to carry out the tests. From the pellets obtained, sheets of dimensions 110×110×3 mm were also injection-molded for determination of scratch hardness, as also were test specimens with dimensions 65×40×3 for the weathering tests and the optical measurements.

An injection-molding machine from Demag; Schwaig DEMAG D150 was used for this purpose. The injection-molding parameters set were as follows:

melt temperature 250° C., mold temperature 70° C., injection pressure: from 120 to 160 bar, hold pressure: from 80 to 75 bar).

The following table includes the constitutions of the products, the tests carried out, and also the test results obtained.

TABLE

Constitution, tests, and test results for various polymer mixtures. Examples A and B are inventive, and examples C and D are non-inventive

| | Solution viscosity number ISO 1628-6, 25° C., chloroform [ml/g] | Example A | B | C (comp.) | D (comp.) |
|---|---|---|---|---|---|
| Copolymer (I) | 48.7 | 25 | 50 | — | — |
| (Co)polymer (II) | 53 | 75 | 50 | 75 | 50 |
| Copolymer (III) | 68 | — | — | 25 | 50 |
| Xenotest (DIN EN ISO 4892, Part 2) | | | | | |
| Optical assessment of surface quality | | | | | |
| Cracking after 1000 h | | none | none | none | none |
| Cracking after 5000 h | | none | none | little | little |
| Cracking after 10 000 h | | none | none | much | much |
| Taber 203 scratch hardness [μm] with applied force of | | | | | |
| 1.0N | | 0.17 | 0.10 | | |
| 1.5N | | 0.70 | 0.21 | | |
| 2.0N | | 1.20 | 0.75 | | |
| 3.0N | | 2.50 | 2.10 | | |
| MVR (ISO 1133, 230° C./3.8 kg) [cm³/10 min] | | 3.4 | 4.3 | 2.4 | 2.0 |
| VST (ISO 306 B) [° C.] | | 112.5 | 114.5 | 111.0 | 114.0 |
| Yellowness index to DIN 6167 (D65/10° illuminant, 3 mm) | | | | | |
| after 0 h | | 0.5 | 0.3 | 1.5 | 1.0 |
| after 10 000 h | | 1.0 | 0.8 | 4.0 | 3.5 |

The Xenotest to DIN EN ISO 4892, Part 2 (artificial weathering or irradiation in devices—filtered xenon arc irradiation) was carried out with a Beta LM Xenotest device. The lower wavelength threshold lambda G=300 nm; black standard temperature=65+/−3° C.; water spray/drying cycle: 18 min of water spray, 102 min of drying time; relative humidity during drying=65%; constant conditions=continuous irradiation of specimens; irradiation intensity=standard method A (artificial weathering); test device: Xenosensitiv (lambda from 300 to 400 nm), controllable from 45 to 120 W/m², the standard specification value of 60 W/m² being used for testing.

What is claimed is:

1. A molding composition, comprising:
   a) a copolymer (I), containing from 90 to 100% by weight of polymerized methyl methacrylate, styrene, and maleic anhydride, and, optionally, from 0 to 10% by weight of other polymerized monomers copolymerizable with methyl methacrylate,
   b) a (co)polymer (II), containing from 96 to 99.5% by weight of polymerized methyl methacrylate and from 0.5 to 4% by weight of polymerized methyl acrylate, whose solution viscosity in chloroform at 25° C. (ISO 1628—Part 6) is from 50 to 55 ml/g, and
   c) optionally conventional additives, auxiliaries, and/or fillers, wherein the solution viscosity of the copolymer (I) in chloroform at 25° C. (ISO 1628—Part 6) is less than or equal to 55 ml/g.

2. The molding composition as claimed in claim 1, wherein the molding composition or a test specimen produced from the molding composition has the following properties simultaneously:

a Vicat softening temperature VST (ISO 306-B50) of at least 109° C., a melt index MVR (ISO 1133, 230° C./3.8 kg) of from 2.5 to 5.0 cm³/10 min, Xenotest weathering resistance (DIN EN ISO 4893, Part 2) after 10,000 hours characterized via a yellowness index (DIN 6167) of less than or equal to 2.0.

3. The molding composition as claimed in claim 1, wherein the increase in the yellowness index (DIN 6167) of a test specimen produced from the molding composition is not more than 1.5 units after Xenotest weathering (DIN EN ISO 4893, Part 2) for 10,000 hours.

4. The molding composition as claimed in claim 1, wherein when the Taber 203 scratch hardness of a test specimen produced from the molding composition is determined using an applied force of 3.0 N the value obtained is not more than 3 μm.

5. The molding composition as claimed in claim 1, wherein the copolymer (I) and the (co)polymer (II) are present in a ratio of from 95 to 5 to 5 to 95 parts by weight.

6. The molding composition as claimed in claim 1, wherein the copolymer (I) has been polymerized from
from 50 to 90% by weight of methyl methacrylate,
from 10 to 20% by weight of styrene, and
from 5 to 15% by weight of maleic anhydride.

7. The molding composition as claimed in claim 1, wherein the proportion of the conventional additives, auxiliaries, and/or fillers is not more than 10% by weight.

8. The molding composition as claimed in claim 1, wherein a lubricant is present as auxiliary.

9. The molding composition as claimed in claim 1, wherein stearyl alcohol is present as auxiliary.

10. The molding composition as claimed in claim 1, wherein the molding composition or a test specimen produced from the molding composition has the following properties simultaneously:
a Vicat softening temperature VST (ISO 306-B50) of at least 109° C., and
a melt index MVR (ISO 1133, 230° C./3.8 kg) of from 2.5 to 5.0 cm$^3$/10 min.

11. The molding composition as claimed in claim 1, wherein copolymer (I) has a weight-average molecular weight of 95,000 g/mol or less.

12. The molding composition as claimed in claim 11, wherein copolymer (II) has a weight-average molecular weight of 80,000 to 200,000 g/mol.

13. One or more molded, extruded, coextruded, laminated or lacquered parts, produced entirely or to some extent from the molding composition as claimed in claim 1 via thermoplastic processing, coextrusion, lamination, or lacquering.

14. The one or more extruded parts as claimed in claim 13, wherein the parts are solid sheets, corrugated sheets, panels having cavities, multiple-web sandwich panels, twin-web sandwich panels, triple-web sandwich panels, quadruple-web sandwich panels, sandwich panels with lattice geometry, or other sandwich panels.

15. The one or more molded parts as claimed in claim 13, wherein the parts are parts of household devices, parts of communications devices, parts of equipment for hobbies, parts of equipment for sports, bodywork parts, parts of bodywork parts in automobile construction, parts of bodywork parts in shipbuilding, parts of bodywork parts in aircraft construction, lamp covers, instrument covers, tachometer covers, panels, or decorative strips.

16. The one or more molded parts as claimed in claim 13, wherein said molded parts comprise at least one coextruded, laminated, or lacquered layer.

17. A method comprising producing one or more molded parts, thermoplastic processed parts, coextruded parts, laminated parts or lacquered parts from the molding composition according to claim 1.

18. A method of coating one or more surfaces of wood, comprising coating at least one wood surface with a molding composition, comprising:
a) a copolymer (I), containing from 90 to 100% by weight of polymerized methyl methacrylate, styrene, and maleic anhydride, and, optionally, from 0 to 10% by weight of other polymerized monomers copolymerizable with methyl methacrylate,
b) a (co)polymer (II), containing from 96 to 99.5% by weight of polymerized methyl methacrylate and from 0.5 to 4% by weight of polymerized methyl acrylate, whose solution viscosity in chloroform at 25° C. (ISO 1628—Part 6) is from 50 to 55 ml/g, and
c) optionally conventional additives, auxiliaries, and/or fillers,
wherein
the solution viscosity of the copolymer (I) in chloroform at 25° C. (ISO 1628—Part 6) is less than or equal to 55 ml/g, and
the Vicat softening temperature VST (ISO 306-B50) of the copolymer (II) is at least 107° C.

19. The method as claimed in claim 18, wherein the molding composition or a test specimen produced from the molding composition has the following properties simultaneously:
a Vicat softening temperature VST (ISO 306-B50) of at least 109° C., and
a melt index MVR (ISO 1133, 230° C./3.8 kg) of from 2.5 to 5.0 cm$^3$/10 min.

20. A method of impregnating wood, comprising impregnating wood with a molding composition, comprising:
a) a copolymer (I), containing from 90 to 100% by weight of polymerized methyl methacrylate, styrene, and maleic anhydride, and, optionally, from 0 to 10% by weight of other polymerized monomers copolymerizable with methyl methacrylate,
b) a (co)polymer (II), containing from 96 to 99.5% by weight of polymerized methyl methacrylate and from 0.5 to 4% by weight of polymerized methyl acrylate, whose solution viscosity in chloroform at 25° C. (ISO 1628—Part 6) is from 50 to 55 ml/g, and
c) optionally conventional additives, auxiliaries, and/or fillers,
wherein
the solution viscosity of the copolymer (I) in chloroform at 25° C. (ISO 1628—Part 6) is less than or equal to 55 ml/g, and
the Vicat softening temperature VST (ISO 306-B50) of the copolymer (II) is at least 107° C.

21. The method as claimed in claim 20, wherein the molding composition or a test specimen produced from the molding composition has the following properties simultaneously:
a Vicat softening temperature VST (ISO 306-B50) of at least 109° C., and
a melt index MVR (ISO 1133, 230° C./3.8 kg) of from 2.5 to 5.0 cm$^3$/10 min.

* * * * *